Nov. 2, 1965

R. L. FORK 3,215,841

LIGHT MODULATOR

Filed Nov. 30, 1962

INVENTOR
R. L. FORK
BY
ATTORNEY

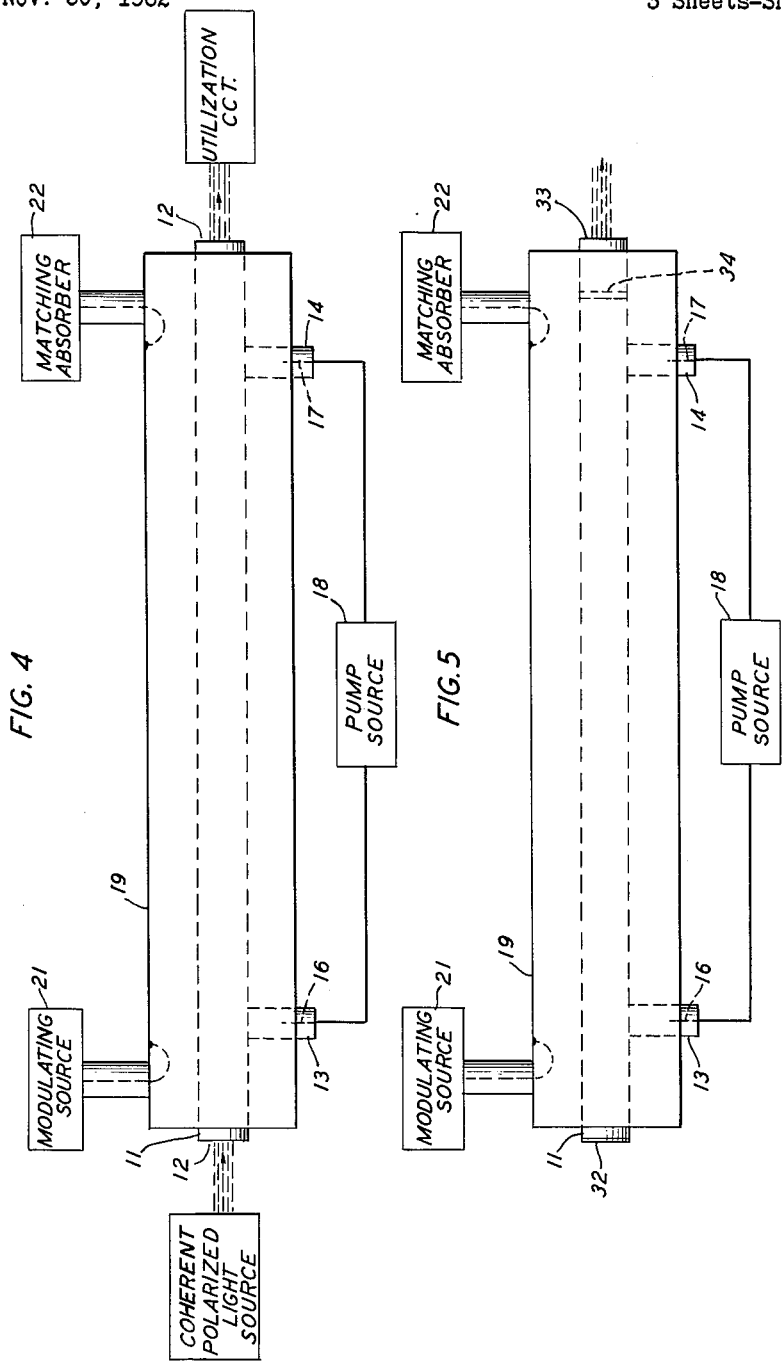

3,215,841
LIGHT MODULATOR
Richard L. Fork, Plainfield, N.J., assignor to Bell Telephone Laboratories, Incorporated, New York, N.Y., a corporation of New York
Filed Nov. 30, 1962, Ser. No. 241,276
19 Claims. (Cl. 250—199)

This invention relates to optical masers and more particularly to apparatus for modulating the output of optical masers.

The development of narrow band coherent light sources such as optical masers of the type disclosed in United States Patent 2,929,922 to A. L. Schawlow and C. H. Townes and in patent application Serial No. 277,651, filed May 2, 1963 as a continuation-in-part of Serial No. 816,276, filed May 27, 1959 by A. Javan assigned to the assignee hereof, has greatly extended the portion of the electromagnetic wave spectrum which is available for communications and related purposes. The optical portion of the spectrum is deemed to extend from the farthest infrared through the visible and ultraviolet wavelengths. Because of the extremely high frequencies associated with such short wavelengths, coherent light beams produced by optical masers are inherently capable of transmitting enormous quantities of information. In order to realize the communication potential of the now accessible optical spectrum, it is necessary to provide apparatus for modulating the output of the optical maser at high modulation frequencies.

Workers in the optical arts have described a number of light modulators which operate by means of variations in one or more of the parameters which govern the interaction between light waves and matter. Among the effects which have been considered are the Kerr and Pockels effects, produced by electric fields acting on certain media through which the light is passed, and the Voigt, the Cotton-Mouton, and the Faraday effects produced by the analogous action of magnetic fields. These as well as other electro-optical and magneto-optical effects may be utilized to modulate the frequency, phase, polarization amplitude or propagation direction of electromagnetic waves.

In most instances, devices of this type are considered operable over a relatively broad band of optical wavelengths in which particular active media display the desired optical effect. If they are to be employed to modulate monochromatic light, care is ordinarily taken to choose an active medium which is highly transparent at the wavelength of interest. That is, the active medium is selected to have no optical resonance or absorption line at that wavelength. In fact, the optical properties of various materials are customarily presented as curves based on data taken far from resonance lines. This is, perhaps, primarily due to the difficulty of measuring other optical effects at resonance where practically all the light in a beam may be absorbed. However, it is well known from both theory and experiment that the optical field-matter interaction is strongest when the optical frequency closely approximates a natural resonance frequency of the medium. Because the resonance absorption is so large, even for vapors and gases at very low pressures, such portions of the spectrum have hitherto generally been avoided despite the fact that other modulatable interactions also attain their maxima at or near resonance.

One way of employing the large optical effects near resonance while simultaneously avoiding at least some of the losses due to absorption is disclosed in United States Patent No. 3,126,485, issued March 24, 1964, to A. Ashkin and A. Yariv. The light modulator disclosed therein makes use of the fact that some optical properties of the medium have their extrema slightly removed from the center of the resonance, while the absorption reaches a maximum at the center. Thus, by employing a modulating medium having a resonance line at a wavelength distinct from but close to that of the light beam, modulation may be achieved with absorption losses at acceptable—but still high—levels. In most systems in which light beam modulation is desired, however, it is advantageous to conserve beam power by minimizing losses in the modulator. Some prior art modulators, unfortunately, are so lossy that it is necessary to amplify the emergent beam before directing it over a transmission path.

It is an object of this invention to modulate a polarized light beam having a wavelength substantially coincident with a resonance line of a modulating medium.

A further object of the invention is to modulate a polarized light beam by utilizing the strong interactions at resonance between optical wave energy and a material medium, and to accomplish this simultaneously with amplification of the light beam.

These and other objects of the invention are achieved in one illustrative embodiment thereof comprising an active medium having an energy level structure characterized by a plurality of discrete energy levels including a pair of optically connected levels defining a resonance. Means are associated with the active medium for directing a polarized light beam over an interaction path therethrough. In addition, means are provided for applying a magnetic or an electric field to the medium. The choice of the field and its orientation with respect to the medium and the light beam path are determined by the properties of the medium and the particular optical effect to be produced. Also included in the embodiment of the invention are means for pumping the active medium to produce therein a population inversion between the optically connected pair of energy levels.

It is a feature of the invention that the active medium is characterized by a tensor dielectric susceptibility whereby the interaction of polarized light waves therewith is anisotropic. The active medium thus may exhibit such anisotropies as linear and circular birefringence and linear and circular dichroism.

A further feature of the invention is that the anisotropies of the active medium are functions of an applied field, magnetic or electric.

It is also a feature of the invention that the anisotropies of the active medium are varied in accordance with the signal information by means of a modulated field applied thereto.

The above-mentioned as well as other objects and features of the invention may be thoroughly understood from the following more detailed discussion taken in conjunction with the accompanying drawing, in which:

FIG. 4 depicts an illustrative embodiment of an amplifier-modulator in accordance with the invention in which the modulating field is applied in the form of an electromagnetic wave; and FIG. 5 shows an oscillator-modulator in accordance with the invention.

Figure 1:
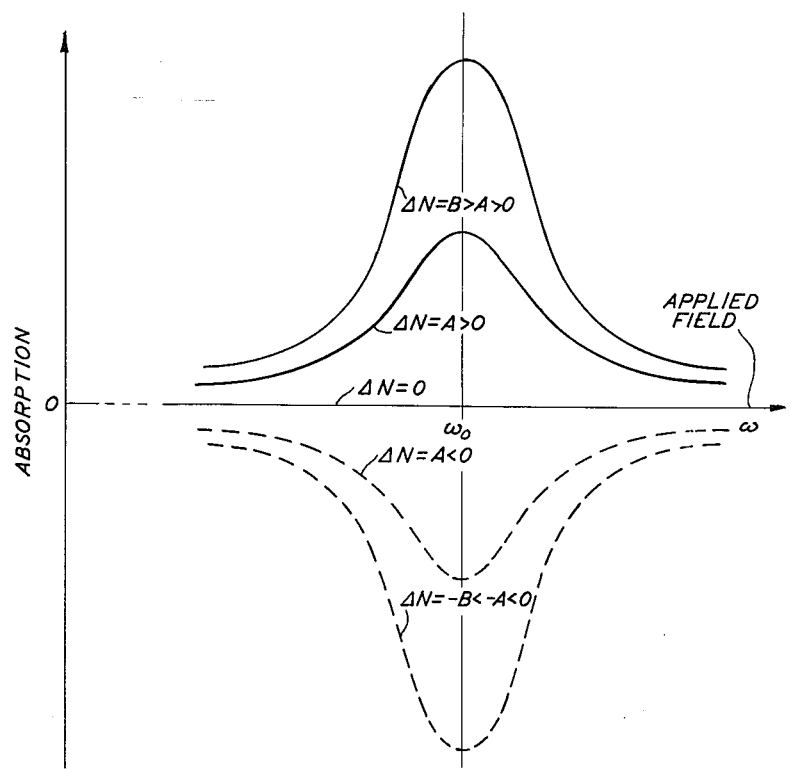
FIG. 1 is a representative plot of the optical absorption of an active medium near a resonance line, under varying conditions of population distribution, as a function of either frequency or applied field.

My invention is based on my realization that in a medium characterized by a tensor dielectric susceptibility the sign as well as the magnitude of various optical anisotropies, such as birefringence and dichroism, is a function of the population difference between a pair of energy levels defining a resonance, and that the magnitude of such anisotropies reaches a maximum at or near the resonance line.

The interaction of light waves with matter may be considered as falling in two broad categories: absorption and dispersion. To the first category belong those interactions in which a change is produced in the amount of energy of a particular frequency in a light beam. The latter classification includes phenomena which produce changes in the frequency, phase or polarization of light waves. When electromagnetic waves interact with matter, a portion of the energy therein is converted to heat—this process, designated "true absorption," may be anisotropic, in which case it may advantageously be utilized in devices of the invention. Another absorptive process is "resonance," in which radiation quanta characterized by a frequency $\nu$ excite atoms or molecules of a medium from a first energy state to a higher state which differs from the first by an energy $h\nu$ where $h$ is Planck's constant. Radiation of the same frequency is subsequently emitted as the excited particles return to their original state. A related process is fluorescence, wherein a portion of the energy $h\nu$ of the exciting quantum is absorbed and the particle relaxes to an intermediate excited state from which it subsequently returns to the initial energy level, emitting a quantum of lower energy $h\nu'$ where $\nu'<\nu$.

Due to their inherent statistical nature, the above-described absorption phenomena in an extended medium are smooth and continuous functions of frequency. Thus, an absorption line typically has an extreme value at the resonant frequency but is spread out over a natural linewidth which is the result of the smaller but finite probability of interactions occuring at other nearby frequencies. In gaseous media especially there is a further broadening of the resonance due to the Doppler shift of light waves emitted from atoms or molecules moving randomly at high speeds.

The occurrence of strong resonance interactions between light waves and matter is predicated on the existence in the medium of a significant population in at least one of the energy levels defining the resonance. Under normal conditions, the relative populations in a medium at thermal equilibrium are given by Boltzmann's distribution. The population of the lower of two energy states having a separation corresponding to frequencies in the optical portion of the spectrum is ordinarily so much greater than that of the upper state that the latter may be disregarded in many calculations. In fact, in the analysis of the optical properties of matter near a resonance it is conventional to treat all particles in the medium as though they were in the lower energy state. Thus, if $N_1$ and $N_2$ are the populations of the lower and the upper states, respectively, the probability that an incident photon of energy $h\nu$ will excite a particle from state 1 to state 2 is a function of $\Delta N = N_1 - N_2$. Normally, $N_2 \ll N_1$ so that $\Delta N \cong {}_{-1}$. In many instances $N_1$ is taken to be equal to N, the total number of particles in the ensemble.

The variation of an absorption coefficient near a resonance is shown by the uppermost curve in FIG. 1 as a function of the frequency $\omega$ or, alternatively, as a function of the intensity of a magnetic or an electric field which, when applied to the medium, varies the separation of the energy levels defining the resonance and hence varies the resonance frequency. The uppermost curve indicates the absorption when $\Delta N$, the population difference between the energy levels of the resonance, has a relatively large positive value B. Various techniques, known to workers in the maser art and generically referred to herein as "pumping" techniques, may be used to apply energy to the medium to decrease the magnitude of $\Delta N$ by increasing the population $N_2$ of state 2, decreasing the population $N_1$ of state 1, or by a combination of such changes. The effect of reducing $\Delta N$ to A where $0 < A < B$ is shown by the second curve in FIG. 1. If sufficient energy is pumped into the medium to reduce $\Delta N$ to 0, there is no absorption at all since the probability of an incident photon causing a transition from state 1 to state 2 is equal to the probability that it will cause the reverse transition. Thus, for each photon absorbed by the medium, one is emitted. Considering only resonance phenomena, the absorption curve for $\Delta N = 0$ lies on the axes in FIG. 1. In devices such as the optical maser, $\Delta N$ is made a negative quantity by pumping the active medium to make $N_2 > N_1$, thereby inverting the normal population distribution. Thus, the absorption coefficient becomes negative, indicating that more light is emitted than is absorbed. The dashed curves in FIG. 1 ilustrate the negative absorption coefficient for $\Delta N = -A$ and $\Delta N = -B$. It can be seen that the magnitude and form of the absorption curve are substantially preserved while the sign is changed from positive to negative.

The analytical expressions for the various dispersive phenomena, as well as those for absorptive effects, contain factors which customarily are taken as dependent on the density of the atomic or molecular dipoles of the material. When such factors are replaced by more precise expressions for the relations among the population of the various energy levels involved, it is found that the effects undergo a change of sign as $\Delta N$ changes from positive to negative, while the magnitude of the effect is in general a function of the magnitude of $\Delta N$.

Figure 2:
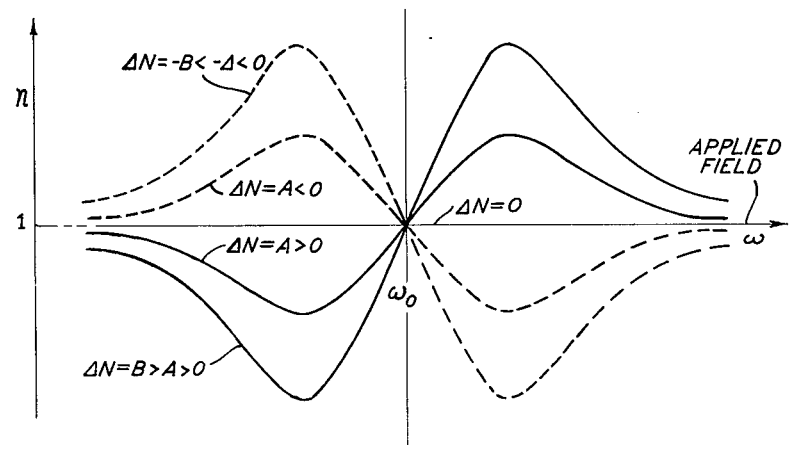
FIG. 2 is a representative plot of the refractive index of an active medium near a resonance line, under varying conditions of population distribution, as a function of either frequency or applied field.

Among the optical properties of matter which undergo such changes is the refractive index n. The solid curves of FIG. 2 indicate the variations of the refractive index near a resonance line, in the region of the so-called "anomalous dispersion," for normal population distributions. The refractive index under varying conditions of population inversion is given by the dashed curves. As can be seen from the straight line representing the index $\Delta N = 0$, the medium has no refractive effect at all on light waves of the resonant frequency when the energy states defining the resonance are equally populated.

The interaction between light waves and matter is customarily described by a dielectric susceptibility. When the susceptibility is a tensor the medium will exhibit anisotropies such as linear and circular birefringence and linear and circular dichroism. A birefringent medium exhibits different refractive indices for orthogonal linear polarizations of light waves in the case of linear birefringence, or for opposite senses of rotation of the polarization vector in the case of circular birefringence.

A dichroic medium exhibits different absorption coefficients for orthogonally polarized waves (linear dichroism) or for opposite senses of rotation of the polarization vector (circular dichroism). These and other characteristics of the interaction of polarized light with matter are discussed in some detail in a book entitled "Polarized Light" by W. A. Shurcliff. The anisotropies which produce such effects may exist naturally in a medium or they may be induced by external fields, electric or magnetic. For purposes of this invention attention is focused on the field-induced anisotropies which may arise either from changes in the energy level structure of the medium, such as the Voigt effect and Faraday rotation, or from a natural or induced anisotropy of the molecules of the medium and their consequent alignment with the applied field. Examples of the latter are the Cotton-Mouton and the Kerr effects.

Light modulators utilizing such effects are known. However, the prior art has not recognized that the inverse or negative forms of these phenomena may be produced in media exhibiting population inversion or "negative temperature." By inverting the population distribution in the active modulator medium, advantage can be taken of the fact that the preferred anisotropies have extrema at or near the center of a resonance line. Just as the anisotropies have their maximum magnitude in uninverted media when $N_2 \ll N_1$ that is, when the population of the lower level of the resonance is much greater than that of the upper state, so the "negative" anisotropies have their maximum magnitudes when the population inversion is greatest. Equivalently, the negative anisotropies are at their peak near resonance lines which are capable of producing the highest gain in an optical maser. Although for purposes of illustration the following discussion will be limited to anisotropies induced by altering the atomic energy level structure, the principles of the invention are not restricted thereto. Similar analyses apply as well to the effects of molecular anisotropy.

Figure 3:
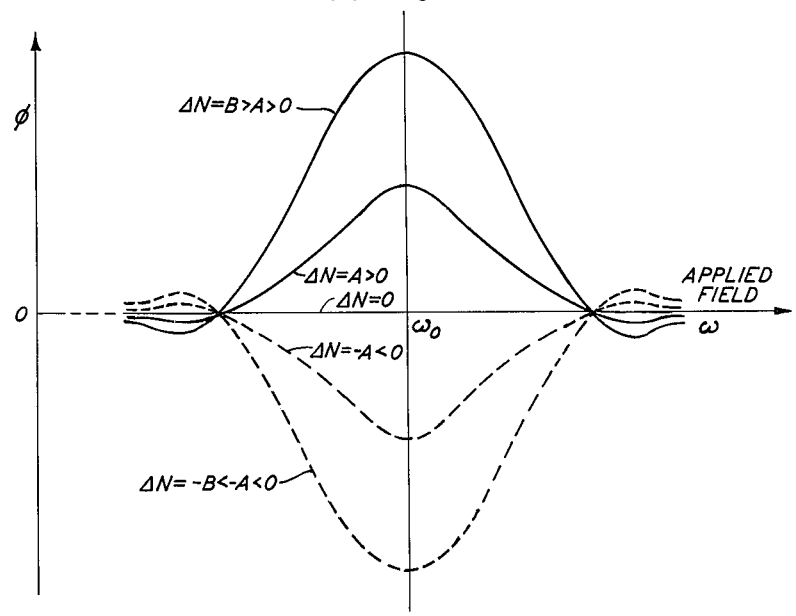
FIG. 3 is a representative plot of the Faraday rotation of an active medium near a resonance line, under varying conditions of population distribution, as a function of frequency or applied field.

One anisotropy which may be advantageously employed in the invention is "negative" circular birefringence. The effect of this anisotropy on a polarized light beam may be designated "negative" Faraday rotation. A typical plot of the rotation angle $\phi$ near a resonance, as a function of applied field or, alternatively, of frequency $\omega$, is shown in FIG. 3 wherein the solid curves indicate the effect under various normal or uninverted population distributions. The shape of the curve as shown is valid for small fields, where the level splitting is small compared to the Doppler linewidth. For larger fields, the curve exhibits maxima on either side of the line center. As can be seen, the rotation is at a maximum at $\omega_0$, the center of the resonance line. The normal or positive effect is greatest when the population of the lower energy state is much greater than that of the upper. As $\Delta N$ is reduced by pumping the amount of rotation decreases, vanishing entirely as the populations of the two levels become equal. Further pumping results in a population inversion. As the sign of $\Delta N$ changes from positive to negative, so does the sign of $\varphi$. That is, the direction of rotation—the "sense" of the anisotropy, is reversed. The magnitude of the negative anisotropy, however, exhibits the same dependence on the magnitude of $\Delta N$ as does that of the positive phenomenon. Inasmuch as the anisotropic modulating medium is in a negative temperature state, the absorption coefficient is also negative and optical maser amplification is produced simultaneously with rotation. Thus, the invention may be designated an amplified-modulator or, if an optical cavity resonator is employed, an oscillator-modulator.

The principal application of the invention is as a modulator for the output of optical masers. Since the optical maser operates with a population inversion between a pair of optically connected energy levels, it follows that for every laser frequency there is an active modulator medium which exhibits the required negative field-dependent anisotropy near a resonance line of the same frequency. That is, of course, the laser medium itself. The existence of the field-dependent anisotropy in every case is assured by the requirement that at least one of the laser energy levels must have a nonzero angular momentum. This follows from the well-known selection rules govering quantum phenomena. Of course, in some instances it may be convenient to employ some other substance in the modulator, provided the above-mentioned conditions can be met.

A negative tensor dielectric susceptibility can be induced in a solid liquid, or gas by an electric or magnetic field. The susceptibility can be calculated from a knowledge of the energy level structure and gain per unit length of the "inverted" active medium at the relevant optical frequency. For purposes of illustration it is convenient to discuss the simplest theoretical case—that of a medium having optical properties which exhibit axial symmetry about the applied field. Gases are such media. As the magnitudes of the anisotropies utilized in the invention are dependent on $\Delta N$, the most advantageous optical maser transitions are those exhibiting high gain, such as the $5d[3/2]_1{}^0 - 6p[3/2]_1$, transition of xenon (Racah notation).

The dielectric susceptibility can be represented by a three tensor. Since there are no preferred directions in a gaseous medium the direction of the applied field becomes an axis of symmetry, with the result that the tensor may be restricted to the general form $$X = \begin{bmatrix} X_{11} & X_{21} & 0 \\ X_{22} & X_{11} & 0 \\ 0 & 0 & X_{33} \end{bmatrix} \quad X_{jk} = X'_{jk} + iX''_{jk}$$

Here both $X'_{jk}$ and $X''_{jk}$ are real. On inserting this susceptibility in Maxwell's equations written in matrix form equations for wave propagation in the medium are obtained.

Assume a rectangular coordinate system and let the field be directed along the $z$ axis. For propagation along $z$ and the field independent of $x$ and $y$ the wave equations are $$\left[\frac{\partial^2}{\partial Z^2} + \omega^2 \mu_0 \epsilon_0 (1 + X_{11} - iX_{21})\right]\epsilon_+ = 0$$

$$\left[\frac{\partial^2}{\partial Z^2} + \omega^2 \mu_0 \epsilon_0 (1 + X_{11} + iX_{21})\right]\epsilon_- = 0$$

$$\epsilon_\pm \equiv \frac{1}{\sqrt{2}}(\epsilon_x \pm i\epsilon_y)$$

where $\omega$ is the angular frequency, $\mu_0$ is the magnetic permeability and $\epsilon_0$ is the dielectric permeability, with subscripts indicating the absence of external fields.

For propagation along $x$, light linearly polarized along $z$, and the field independent of $z$ and $y$ the formulas yield the wave equation $$\left[\frac{\partial^2}{\partial X^2} + \omega^2 \mu_0 \epsilon_0 (1 + X_{33})\right]\epsilon_Z = 0$$

The effective dielectric coefficients for these three types of waves are then $$\epsilon_+ \equiv \epsilon'_+ + i\epsilon''_+ = [1 + X_{11} - iX_{21}]$$
$$= [1 + X'_{11} + X''_{21} + i(X''_{11} - X'_{21})]$$
$$\epsilon_- \equiv \epsilon'_- + i\epsilon''_- = [1 + X_{11} - iX_{21}]$$
$$= [1 + X'_{11} - X''_{21} + i(X''_{11} + X'_{21})]$$
$$\epsilon_\pi \equiv \epsilon'_\pi + i\epsilon''_\pi = [1 + X_{33}]$$
$$= [1 + X'_{33} + iX''_{33}]$$

The imaginary parts of these dielectric constants may be obtained from a knowledge of the scalar gain coefficient and the gyromagnetic ratios $(g)$ and J values of the participating levels. The gain coefficient is $$\alpha_0 = \sum_{m, m'} \beta_{m,m'} \frac{2}{\Delta\nu_D}\sqrt{\frac{\ln 2}{\pi}} \frac{\pi e^2}{m_0 c^2} f(N_m - N'_{m'}), \sum_{m, m'} \beta_{m, m'} = 1$$

Here $\Delta\nu_D$ denotes the Doppler linewidth, $m_0$ the electonic mass, f the oscillator strength, and $m'$ and m the magnetic substates of the upper and lower electronic states respectively. The constant $\beta_{m,m'}$ represents the relative strength of the transition $m,m'$ and $N_j$ denotes the number of atoms in magnetic sublevel j. The term $N_m - N'_{m'}$ is of particular importance in understanding the invention. As $N'_{m'}$ is made larger than $N_m$ a change of sign is introduced which as well as changing the absorption into a gain alters the sense of the birefringence and dichroism of the medium. Also, if $N_m \neq N_{m+k}$ or $N'_m$ $\neq N'_{m'+k'}$ where k is to be taken as a non-zero integer, that is, if the magnetic substates are unequally populated, an anisotropy of the medium arises even in the absence of an external field. This situation implies the existence of a paramagnetic susceptibility. The dielectric susceptibility can be perturbed by both the Zeeman splitting and by altering the level populations, for example, with a microwave field oscillating at the level splitting frequency. To simplify the discussion, attention will be confined to the case where $N'_{m'}=N'_{m'+k}$ and $N_m=0$ that is, where the magnetic substates are equally populated the only magnetic susceptibility is diamagnetic, and all atoms are in the upper state.

The scalar gain coefficient is assumed to be $$\alpha = \alpha_0 e^{-\omega^2}$$

where $$\omega = 2\sqrt{\ln 2}(\nu-\nu_0)/\Delta\nu_D$$

and $\nu_0$ is the central resonance frequency. Having assumed the magnetic substates to be equally populated, the gain coefficients and consequently the imaginary parts of the dielectric constants for the various polarizations of light, can be written as follows $$\alpha_+ = \epsilon_+''/\epsilon_0/\lambda = /\lambda^{-1}\sum_m B_{m+1,m}$$

$$\alpha_- = \epsilon_-''/\epsilon_0/\lambda = /\lambda^{-1}\sum_m B_{m-1,m}$$

$$\alpha_\pi = \epsilon_\pi''/\epsilon_0/\lambda = /\lambda^{-1}\sum_m B_{m,m}$$

The term $B_{m,m'}$ is defined as follows $$B_{m,m'} \equiv \alpha_0/\lambda[e^{-\omega^2_{mm'}} - (2a/\sqrt{\pi})[1-2\omega_{mm'}F(\omega_{mm'})]]$$

An additional term, $A_{m,m'}$ which will be required later is also defined at this time $$A_{m,m'} \equiv \frac{\alpha_0/\lambda}{\sqrt{\pi}}[F(\omega_{mm'}) - \sqrt{\pi}a\omega_{mm'}e^{-\omega^2_{mm'}}]$$

$$\omega_{mm'} \equiv (2\sqrt{\ln 2}/\Delta\nu_D)[\nu-\nu_0+(H\mu_B/h)(mg+m'g')]$$

$\mu_B$ here is the Bohr magnetron, H the magnetic field and $$F(\omega) = e^{-\omega^2}\int_0^\omega e^{y^2}dy$$

The components $X''_{11}$, $X'_{21}$, and $X''_{33}$ of the susceptibility tensor can now be expressed in terms of the imaginary parts of the corresponding dielectric constants.

$$X''_{11} = \epsilon''_+ + \epsilon''_- \quad X'_{21} = \epsilon''_- - \epsilon''_+ \quad X''_{33} = \epsilon''_\pi$$

The remaining components of the susceptibility tensor $X'_{11}$, $X''_{21}$, and $X'_{33}$ can now be obtained through application of the tensor analogs of the Kramers-Kronig relations.

$$X'_{jk}(\omega) = \frac{2}{\pi}P\int_0^\infty \frac{\Omega X''_{jk}(\Omega)d\Omega}{\Omega^2-\omega^2}$$

$$X''_{jk}(\omega) = \frac{2\omega}{\pi}\int_0^\infty \frac{X'_{jk}(\Omega)d\Omega}{\Omega^2-\omega^2}$$

The resulting elements of the susceptibility tensor are thus $$X_{11} = -\frac{1}{2}\sum_m\{[A_{m+1,m}+A_{m-1,m}]+i[B_{m+1,m}+B_{m-1,m}]\}$$

$$X_{21} = -\frac{1}{2}\sum_m\{[B_{m+1,m}-B_{m-1,m}]-i[A_{m+1,m}-A_{m-1,m}]\}$$

$$X_{33} = -\sum_m\{A_{m,m}+iB_{m,m}\}$$

Parameters specifying the optical behavior of the medium may be calculated from the elements of the susceptibility tensor and are given in Table I.

*Table I: Optical parameters*

Field orientations $\vec{H}$ parallel to $\vec{k}$:

Right circularly polarized light—
Gain coefficient $$\alpha_+ = \sum_m /\lambda^{-1}B_{m+1,m}$$

Refractive index $$n_+ - 1 = \sum_m A_{m+1,m}$$

Left circularly polarized light—
Gain coefficient $$\alpha_- = \sum_m /\lambda^{-1}B_{m-1,m}$$

Refractive index $$n_- - 1 = \sum_m A_{m-1,m}$$

$\vec{H}$ perpendicular to $\vec{k}$:

Light linearly polarized along $\vec{H}$—
Gain coefficient $$\alpha_\pi = \sum_m /\lambda^{-1}B_{m,m}$$

Refractive index $$n_\pi - 1 = \sum_m A_{m,m}$$

Light linearly polarized perpendicular to $\vec{H}$—
Gain coefficient $$\alpha_2 = \sum_m \frac{/\lambda^{-1}}{2}[B_{m+1,m}+B_{m-1,m}]$$

Refractive index $$n_o - 1 = \frac{1}{2}\sum_m [A_{m+1,m}+A_{m-1,m}]$$

Circular birefringence $$(n_+ - n_-) = \sum_m [A_{m+1,m}-A_{m-1,m}]$$

Circular dichroism $$(\alpha_+ - \alpha_-) = \sum_m [B_{m+1,m}-B_{m-1,m}]$$

Linear birefringence $$n_\sigma - n_\pi = \sum_m [A_{m+1,m}+A_{m-1,m}-2A_{m,m}]$$

Linear dichroism $$\alpha_\sigma - \alpha_\pi = \sum_m [B_{m+1,m}+B_{m-1,m}-2B_{m,m}]$$

Faraday rotation for pathlength $l$ $$\Phi \equiv \frac{(n_+-n_-)l}{2/\lambda} = \frac{\alpha_0 l}{2\sqrt{\pi}}\sum_m [F(\omega_{m,m+1})-F(\omega_{m,m-1}) - \sqrt{\pi}a(\omega_{m,m+1}e^{-\omega^2_m,m-1}+\omega_{m,m-1}e^{-\omega^2_m,m+1})]$$

For the $5d[3/2]^0_1 - 6p[3/2]_1$ transition of xenon the angle of rotation is $$\varphi \simeq \frac{k_0 l}{\sqrt{\pi}}\frac{(g_D+g_d)}{2}\frac{\mu_B H}{h}\frac{2\sqrt{\ln 2}}{\Delta\nu_D}$$

where $k_0 l$ is defined as the natural logarithm of the transmitted intensity divided by the incident intensity for a path of length $l$ in the medium, $g_p$ and $g_d$ are the $g$ values of the lower and upper states respectively, $\mu_B$ is the Bohr magnetron, $h$ is Planck's constant, and $\Delta\nu_D \cong 200$ megacycles, $g_p = 1.022$, $g_d = 1.376$, and $k_0 l \cong 1.02$. Thus $\varphi = .088$ radians/meter-gauss $= .23$ degrees/meter-gauss.

A typical modulator in accordance with the principles of the invention is illustrated in FIG. 4. A gaseous active medium, such as xenon, is contained in an elongated tube 11 which may be of quartz. Transparent windows 12 at the ends of the tube 11 define a path through the active medium for a polarized light beam to be modulated. The tube 11 is provided with extensions 13 and 14 for housing electrodes 16 and 17 which when connected to a pump source 18 are used to maintain a direct current discharge through the gaseous medium.

The apparatus described in the preceding paragraph is substantially identical to a conventional gaseous optical maser except for the fact that there is no optical cavity resonator. That is, the light beam to be modulated makes but a single pass through the active medium where it is amplified simultaneously with being affected by the anisotropics thereof. Although the magnetic or electric modulating field may be applied by a solenoid or by a pair of electrodes, most applications of the invention will utilize higher modulation frequencies than can be applied by such apparatus. In the preferred embodiment depicted in FIG. 4 the modulating field is applied to the active medium by wave propagating means, such as a waveguide 19. High frequency modulating energy is supplied to the waveguide 19 by a modulating source 21 coupled thereto. An absorber 22 having a matching impedance may advantageously be coupled to the end of the waveguide 19 remote from the source 21. In this way undesirable reflections of the modulating wave are prevented.

In some cases, it may be preferred to utilize a cavity resonant at the modulating frequency. This arrangement permits more efficient coupling to the active medium, but places some restrictions on the modulation frequency and bandwidth. In practicing the invention it is preferred that the phase velocity of the modulating wave in the wave propagating means be substantially matched to that of the light waves in the active medium. This may be accomplished in a manner known in the art as, for example, by loading the interior of the waveguide with a suitable dielectric. Various orientations of the applied field with respect to the light beam path are feasible and may be established by selecting a particular mode of propagation of the modulating wave in the waveguide. An axial magnetic field may be produced, for example, by utilizing a helical waveguide. Other configurations are within the skill of workers in the microwave art.

In FIG. 5 there is shown a light modulator illustrating the invention and utilizing an optical cavity resonator formed by a totally reflective mirror 32 and a partially reflective, partially transmissive mirror 33 which permits optical power to be abstracted from the resonator. Included within the resonator cavity is a polarizer 34 for determining a preferred polarization direction therein. Use of the optical resonator provides a long interaction path in a relatively short overall length, but at the cost of some bandwidth and frequency limitations. Such a device functions as an optical maser oscillator as well as a modulator. The output beam will be amplitude modulated by the variation in the orientation of the polarization vector with respect to the polarizer 34.

In an experimental arrangement a xenon optical maser oscillator produced a polarized light beam which was directed through an amplifier-modulator. The oscillator cavity was made so short that substantially all longitudinal modes but one were eliminated. The output frequency was tuned over the Doppler linewidth by varying the spacing between the reflectors. Measurements were made with the oscillator frequency set at the center of the resonance. A modulating field was applied by means of a solenoid coaxial with the amplifier tube and negative Faraday rotation was observed, the angle of rotation being a function of the pump power, the frequency and the intensity and direction of modulating field.

Although the invention has been described with particular reference to specific embodiments, this is to be taken as illustrative only and not as a limitation. For example, a biasing field may be utilized in addition to the modulating field, in which case the device may be tuned over a relatively broad band. A graduated field may be utilized to broaden the resonance line, thereby giving greater bandwidth. Many other variations and modifications of the invention are possible and may be made by those skilled in the art to which it pertains without departing from its scope and spirit.

What is claimed is:

1. An optical amplifier-modulator comprising
   an active medium having an energy level structure characterized by a plurality of discrete energy levels including a pair of optically connected levels having a separation corresponding to the wavelength of the light to be amplified and modulated,
   means defining a light beam path through said medium,
   means for inducing in said medium a field-dependent anisotropy to cause said medium to interact differently with light wave energy of different polarizations,
   means for varying said anisotropy in accordance with signal information thereby varying the interaction of said medium with said light wave energy and modulating said beam,
   and means for pumping said medium to produce therein a population inversion between said pair of optically connected energy levels, said population inversion resulting simultaneously in reversal of the modulated changes in polarization direction and in amplification of said beam.

2. A communications system comprising an optical amplifier-modulator as claimed in claim 1 and including a coherent light source for directing a light beam to the input end of said amplifier-modulator, and utilization apparatus separated by a transmission path from the output end thereof.

3. An optical amplifier-modulator comprising
   an active medium having an energy level structure characterized by a plurality of discrete energy levels including a pair of levels defining a resonance in the optical portion of the spectrum,
   means defining a beam path through said medium for polarized light of a wavelength resonant with said pair of levels,
   means for causing said medium to exhibit a tensor dielectric susceptibility whereby the interaction of polarized light waves with said medium is characterized by a field-dependent anisotropy,
   means for modulating the polarization of a resonant light beam by varying said anisotropy in accordance with signal information,
   and means for pumping said medium to produce therein a population inversion between the energy levels defining said resonance thereby simultaneously reversing the sense of the modulated changes in the polarization and amplifying said beam.

4. A communications system comprising an optical amplifier-modulator as claimed in claim 3 and including a source of coherent polarized light for directing a light beam to the input end of said amplifier-modulator, and utilization apparatus separated by a transmission path from the output end thereof.

5. An optical amplifier-modulator comprising
   an active medium having an energy level structure characterized by a plurality of discrete energy levels including a pair of levels defining a resonance in the optical portion of the spectrum, means defining a beam path through said medium for polarized light of a wavelength resonant with said pair of levels, field producing means for causing said medium to exhibit a tensor dielectric susceptibility whereby the interaction of polarized light waves with said medium is characterized by a field-dependent anisotropy.

means for applying a modulated field to said medium for varying said anisotropy in accordance with signal information, and means for pumping said medium to produce therein a population inversion between said pair of energy levels thereby simultaneously reversing the sense of said anisotropy and amplifying said beam.

6. An optical amplifier-modulator as claimed in claim 5 wherein said modulated field applying means includes wave propagating means, said modulated field being applied in the form of an electromagnetic wave propagating with a phase velocity substantially matched to the phase velocity of the light beam in said active medium.

7. An optical amplifier-modulator comprising an active medium having an energy level structure characterized by a plurality of discrete energy levels including a pair of levels defining a resonance in the optical portion of the spectrum, means defining a beam path through said medium for polarized light of a wavelength resonant with said pair of levels, means for causing said medium to exhibit a tensor dielectric susceptibility whereby the interaction thereof with polarized light waves is characterized by field-dependent dichroism, means for applying a modulated field to said medium for varying said dichroism in accordance with signal information, and means for pumping said medium to produce therein a population inversion between said pair of energy levels thereby simultaneously reversing the sense of said anisotropy and amplifying said beam.

8. An optical amplifier-modulator comprising an active medium having an energy level structure characterized by a plurality of discrete energy levels including a pair of levels defining a resonance in the optical portion of the spectrum, means defining a beam path through said medium for polarized light of a wavelength resonant with said pair of levels, means for causing said medium to exhibit a tensor dielectric susceptibility whereby the interaction thereof with polarized light waves is characterized by field-dependent birefringence, means for applying a modulated field to said medium for varying said birefringence in accordance with signal information, and means for pumping said medium to produce therein a population inversion between said pair of energy levels thereby simultaneously reversing the sense of said birefringence and amplifying said beam.

9. An optical amplifier-modulator comprising an active medium having an energy level structure characterized by a plurality of discrete energy levels including a pair of levels defining a resonance in the optical portion of the spectrum, means defining a beam path through said medium for polarized light of a wavelength resonant with said pair of levels, means for applying a magnetic field to said medium whereby the dielectric susceptibility thereof is caused to assume a tensor form and the interaction of polarized light waves with said medium is characterized by a field-dependent anisotropy, means for modulating said magnetic field in accordance with signal information thereby producing a corresponding modulation of said anisotropy, and means for pumping said medium to produce therein a population inversion between said pair of energy levels thereby simultaneously reversing the sense of said anisotropy and amplifying said beam.

10. An optical amplifier-modulator as claimed in claim 9 wherein said magnetic field has a major component parallel to the propagation direction of said light beam.

11. An optical amplifier-modulator as claimed in claim 9 wherein said magnetic field has a major component orthogonal to the propagation direction of said light beam.

12. An optical amplifier-modulator as claimed in claim 9 wherein said active medium exhibits field-dependent birefringence.

13. An optical amplifier-modulator as claimed in claim 9 wherein said active medium exhibits field-dependent dichroism.

14. An optical amplifier-modulator comprising an active medium having an energy level structure characterized by a plurality of discrete energy levels including a pair of levels defining a resonance in the optical portion of the spectrum.

means defining a beam path through said medium for polarized light of a wavelength resonant with said pair of levels, means for applying an electric field to said medium whereby the dielectric susceptibility thereof is caused to assume a tensor form and the interaction of polarized light waves with said medium is characterized by a field-dependent anisotropy, means for modulating said electric field in accordance with signal information thereby producing a corresponding modulation of said anisotropy, and means for pumping said medium to produce therein a population inversion between said pair of energy levels thereby simultaneously reversing the sense of said anisotropy and amplifying said beam.

15. An optical amplifier-modulator as claimed in claim 14 wherein said electric field has a major component parallel to the propagation direction of said light beam.

16. An optical amplifier-modulator as claimed in claim 14 wherein said electric field has a major component orthogonal to the propagation direction of said light beam.

17. An optical amplifier-modulator as claimed in claim 14 wherein said active medium exhibits field-dependent birefringence.

18. An optical amplifier-modulator as claimed in claim 14 wherein said active medium exhibits field-dependent dichroism.

19. An optical oscillator-modulator comprising an active medium having an energy level structure characterized by a plurality of discrete energy levels including a pair of levels defining a resonance frequency in the optical portion of the spectrum, means defining an optical cavity resonator adapted to resonate at said frequency, said active medium being disposed within said resonator, means within said cavity resonator for establishing a preferred polarization of optical waves resonant therein, means for causing said active medium to exhibit a tensor dielectric susceptibility whereby the interaction of polarized light waves therewith is characterized by a field-dependent anisotropy, means for applying a modulated field to said medium for varying said anisotropy in accordance with signal information, means for pumping said medium to produce therein a population inversion between the energy levels defining said resonance thereby simultaneously reversing the sense of said anisotropy and producing oscillation in said resonator, and means for abstracting modulated light wave energy from said cavity resonator.

References Cited by the Examiner

UNITED STATES PATENTS

| | | | |
|---|---|---|---|
| 2,788,710 | 4/57 | West | 250—199 |
| 2,929,922 | 3/60 | Schawlow et al. | 250—199 |
| 3,098,112 | 7/63 | Horton | 250—199 |
| 3,125,485 | 3/64 | Ashkin et al. | 250—199 |

OTHER REFERENCES

Bloembergen et al.: Physical Review, vol. 20, No. 6, Dec. 15, 1960, pp. 2014–2023.

Snitzer: Journal of Applied Physics, vol. 32, No. 1, Jan. 1961, pp. 36–39.

Blumenthal, Proc, I.R.E., vol. 50, No. 4, Apr. 1962, pp. 452–456.

Geuic et al.: Bell Supt. Tech. Journal, vol. 61, July 1962, pp. 1371–1397.

DAVID G. REDINBAUGH, *Primary Examiner.*